US010707607B2

(12) United States Patent
Muramatsu et al.

(10) Patent No.: US 10,707,607 B2
(45) Date of Patent: Jul. 7, 2020

(54) POWER DISTRIBUTION BRANCH UNIT AND VEHICLE

(71) Applicant: HONDA MOTOR CO., LTD., Minato-ku, Tokyo (JP)

(72) Inventors: Miharu Muramatsu, Wako (JP); Hiroo Yamaguchi, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 48 days.

(21) Appl. No.: 16/128,607

(22) Filed: Sep. 12, 2018

(65) Prior Publication Data
US 2019/0089086 A1 Mar. 21, 2019

(30) Foreign Application Priority Data

Sep. 15, 2017 (JP) .................... 2017-177243

(51) Int. Cl.
*H01R 13/40* (2006.01)
*H01R 13/62* (2006.01)
(Continued)

(52) U.S. Cl.
CPC .............. *H01R 13/40* (2013.01); *B60L 53/18* (2019.02); *H01R 13/5208* (2013.01);
(Continued)

(58) Field of Classification Search
CPC ... B60R 16/03; B60R 16/0215; B60R 16/033; B60R 16/0207; B60R 16/02; B60R 16/0315; B60R 16/0238; B60R 16/0239; B60R 16/023; B60R 11/02; B60R 1/06; B60R 1/074; B60R 1/1207; B60R 2001/1223; B60R 2001/1253; B60R 25/252; H01R 2201/26; H01R 13/629; H01R 13/66; H01B 7/0045; H01B 7/00; H01B 7/0823; H01B 7/285; B60K 37/00; B60K 1/04; B60K 2001/0411; B60K 2001/0416; B60K 2001/0455; B60K 2001/0477; B60K 2001/0483; B60K 6/40; B60L 53/14; B60L 53/16; B60L 53/30; B60L 53/65; B60L 58/21; B60L 2210/10; (Continued)

(56) References Cited

U.S. PATENT DOCUMENTS 4,834,670 A * 5/1989 Rodondi .............. H01R 4/2462
439/398
5,567,173 A * 10/1996 Franckx ............... H01R 4/2433
439/403
(Continued)

FOREIGN PATENT DOCUMENTS

JP 2004-273381 9/2004

*Primary Examiner* — Edwin A. Leon
*Assistant Examiner* — Matthew T Dzierzynski
(74) *Attorney, Agent, or Firm* — Amin, Turocy & Watson, LLP

(57) ABSTRACT

In a case of a power distribution branch unit used in a vehicle or the like, one end of a branch wiring is connected to an exposed part of a main covered cable (a part where a core wire is exposed without an insulation cover). Branch couplers are connected to the other ends of the branch wiring and fixed to the case so as to be exposed to an outside. At least one retainer is disposed inside a hole part that is formed in the case and fixes the main covered cable.

11 Claims, 10 Drawing Sheets

(51) Int. Cl.
*H01R 13/52* (2006.01)
*H01R 13/58* (2006.01)
*B60L 53/18* (2019.01)

(52) U.S. Cl.
CPC ..... *H01R 13/5213* (2013.01); *H01R 13/5825* (2013.01); *H01R 13/62* (2013.01); *H01R 2201/26* (2013.01)

(58) Field of Classification Search
CPC .. B60L 53/11; B60L 53/31; B60L 1/02; B60L 2210/30; B60L 3/0046; B60L 3/04; B60L 50/64; B60L 53/12; B60L 53/18; B60L 53/302; B60L 53/665; B60L 53/68; B60L 58/18; B60L 11/1814; B60L 11/1825; B60L 1/003; B60L 2200/12; B60L 2200/26; B60L 2210/20; B60L 2230/14; B60L 2230/16; B60L 2240/34; B60L 2240/36; B60L 2240/525; B60L 2240/70; B60L 2250/10; B60L 2250/16; B60L 2260/26; B60L 2270/145; B60L 2270/30; B60L 2270/34; B60L 3/003; B60L 3/0053; B60L 3/0061; B60L 3/12; B60L 50/20; B60L 50/66; B60L 53/00; B60L 53/122; B60L 53/126; B60L 53/22; B60L 53/305; B60L 53/32; B60L 53/51; B60L 53/53; B60L 53/60; B60L 53/63; B60L 53/64; B60L 53/67; B60L 53/80; B60L 55/00; B60L 58/13; B60L 58/22
USPC ....... 439/658, 589, 587, 274, 275, 449, 467, 439/638; 174/71 R, 72 R
See application file for complete search history.

(56) References Cited

U.S. PATENT DOCUMENTS

| | | | | |
|---|---|---|---|---|
| 5,908,326 | A * | 6/1999 | Neuhauser | H01R 4/2454 |
| | | | | 439/398 |
| 6,200,156 | B1 * | 3/2001 | Hiraki | H01C 13/00 |
| | | | | 338/160 |
| 6,692,311 | B1 * | 2/2004 | Kamei | H01R 9/2458 |
| | | | | 439/218 |
| 8,257,111 | B1 * | 9/2012 | Smutny | H01R 13/5208 |
| | | | | 439/511 |
| 10,418,755 | B2 * | 9/2019 | Kahlman | G06F 13/382 |
| 2018/0337463 | A1 * | 11/2018 | Washio | H01R 4/24 |
| 2019/0084508 | A1 * | 3/2019 | Muramatsu | B60L 1/02 |

* cited by examiner

POWER DISTRIBUTION BRANCH UNIT AND VEHICLE

CROSS-REFERENCE TO RELATED APPLICATION

This application is based upon and claims the benefit of priority from Japanese Patent Application No. 2017-177243 filed on Sep. 15, 2017, the contents of which are incorporated herein by reference.

BACKGROUND OF THE INVENTION

Field of the Invention

The present invention relates to a power distribution branch unit that branches current and a vehicle including the power distribution branch unit.

Description of the Related Art

When current is branched in an electric vehicle, a power distribution branch unit (or an electric connection box or a junction box) as disclosed in Japanese Laid-Open Patent Publication No. 2004-273381 is provided, for example. Japanese Laid-Open Patent Publication No. 2004-273381 discloses a connector fitting structure in which a connector group directly attached to an apparatus and another connector group on a counterpart side are easily fitted to and separated from each other by a turning operation of a bolt. Furthermore, in this connector fitting structure, a fuse incorporated in the connector group can be safely exchanged ([0001]).

SUMMARY OF THE INVENTION

As described above, in the power distribution branch unit according to Japanese Laid-Open Patent Publication No. 2004-273381, one connector group is directly attached to the apparatus ([0001]). Thus, the layout in the power distribution branch unit is limited. In addition, the connector group positioned on the counterpart side relative to the connector group directly attached to the apparatus is connected to a power distribution branch connector all through the connectors (FIG. 1, for example). Therefore, the size becomes large by each connector.

Such a problem occurs not just in electric vehicles but also in other devices or structures that use power distribution branch units.

The present invention has been made in view of the above problem, and an object is to provide a vehicle and a power distribution branch unit which achieve at least one of improved layout flexibility and miniaturization.

A power distribution branch unit of the present invention includes: a case; at least one main covered cable configured to penetrate through the case and including an exposed part where a core wire is exposed without an insulation cover inside the case; a branch wiring disposed inside the case and having one end connected to the exposed part of the main covered cable; a branch coupler connected to another end of the branch wiring and fixed to the case so as to be exposed to an outside; and at least one retainer disposed inside a hole part that is formed in the case and configured to fix the main covered cable.

In the present invention, the main covered cable penetrates through the case. On the other hand, the branch coupler is disposed through the branch wiring that is connected to the exposed part of the main covered cable. Thus, by branching the power line without a connector (coupler), the flexibility of layout can be improved and the power distribution branch unit can be downsized.

The branch wiring and the core wire that is exposed without an insulation cover are connected. Thus, the position of the exposed part of the core wire can be selected; therefore, the flexibility of layout is improved.

Furthermore, the main covered cable is fixed to the case through the retainer. Thus, if vibration is transmitted from the outside to the inside of the case through the main covered cable, the retainer can absorb the vibration. In particular, if the vibration absorption characteristic of the retainer is higher than that of the case itself, the vibration can be easily absorbed. Thus, the vibration from the outside is less likely to reach the connection part where the branch wiring and the exposed part of the core wire are connected. Therefore, it becomes easy to prevent the separation between the core wire and the branch wiring due to vibration reaching the connection part from outside.

In the power distribution branch unit, a plurality of main covered cables may be provided. In addition, the retainer may be disposed one on each side of the exposed part. Each retainer may be configured to fix the plurality of main covered cables.

Thus, compared with a case where the retainer is provided on only one side of the exposed part, it is easy to prevent the vibration from reaching the connection part. Therefore, it becomes easier to prevent the separation between the core wire and the branch wiring due to vibration reaching the connection part from outside.

In addition, since the multiple main covered cables can be fixed together by each retainer, the number of parts can be reduced compared with a case where the multiple main covered cables are fixed by separate retainers.

On an outer peripheral surface of the retainer, a retainer-side tapered surface that inclines so as to separate from the main covered cable toward an outside of the power distribution branch unit may be formed. In addition, on an inner peripheral surface of the case, a case-side tapered surface disposed in a pressed state on the retainer-side tapered surface may be formed. Therefore, by pushing the retainer into the case, the retainer can be positioned.

The retainer may include a first half body and a second half body. The first half body may include a claw part. The second half body may include a depressed part configured to entirely house the claw part, and a raised part formed inside the depressed part and configured to engage with the claw part. Thus, the main covered cable can be easily fixed by the retainer. In addition, since the entire claw part is disposed inside the depressed part, the claw part does not interfere when the retainer is pushed into the case and fixed.

The retainer may include a case contact part directly supported by the case and a grommet contact part supported by the case through a grommet. As described above, the displacement of the retainer can be easily prevented in the part where the case contact part is directly supported by the case, and the waterproof performance can be secured by the grommet contact part.

The power distribution branch unit may include an internal fixing member configured to fix the main covered cable to the case without being in contact with the core wire inside the case. Thus, since the main covered cable is fixed by the internal fixing member in addition to the retainer, the connection in the connection part is maintained easily in a more favorable manner.

A vehicle according to the present invention includes the power distribution branch unit, an engine, a travel motor, an energy storage device, a power conversion device, and an electric auxiliary machine, wherein: the main covered cable of the power distribution branch unit is configured to connect the energy storage device and the power conversion device; the branch coupler and the electric auxiliary machine are connected by an auxiliary machine wiring; and the power conversion device is configured to convert power from the energy storage device and supply the converted power to the travel motor.

Thus, even when the current from the energy storage device is branched using the power distribution branch unit, it is not necessary to provide a connector for the main covered cable in the power distribution branch unit.

In addition, in the vehicle in which the engine generates vibration, even when the vibration is transmitted to the connection part between the main covered cable and the branch wiring, the connection in the connection part is maintained easily in a favorable manner by suppressing tension and/or twist of the main covered cable.

The power distribution branch unit may be disposed on a dashboard of the vehicle. Thus, the power distribution branch unit is supported by or fixed to a part of the vehicle body that is different from the sub frame (that supports the travel motor and the power conversion device) or the main frame (that supports the energy storage device). Therefore, the vibration from the travel motor is less likely to transmit to the power distribution branch unit. In the vehicle that always generates vibration, the electric connections in the power distribution branch unit can be maintained easily in a favorable manner.

In addition, even when the power distribution branch unit is supported by or fixed to a part of the vehicle body that is different from the sub frame and the main frame, the power distribution branch unit can be disposed in a position relatively close to the power conversion device when the power distribution branch unit is fixed to the dashboard. Furthermore, the power distribution branch unit can be also disposed in a position relatively close to the air conditioner, in addition to the power conversion device; therefore, space saving can be easily achieved.

In the present invention, at least one of improved layout flexibility and miniaturization can be achieved.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

A. First Embodiment

<A-1. Structure>
[A-1-1. Overall Structure]

Figure 1:
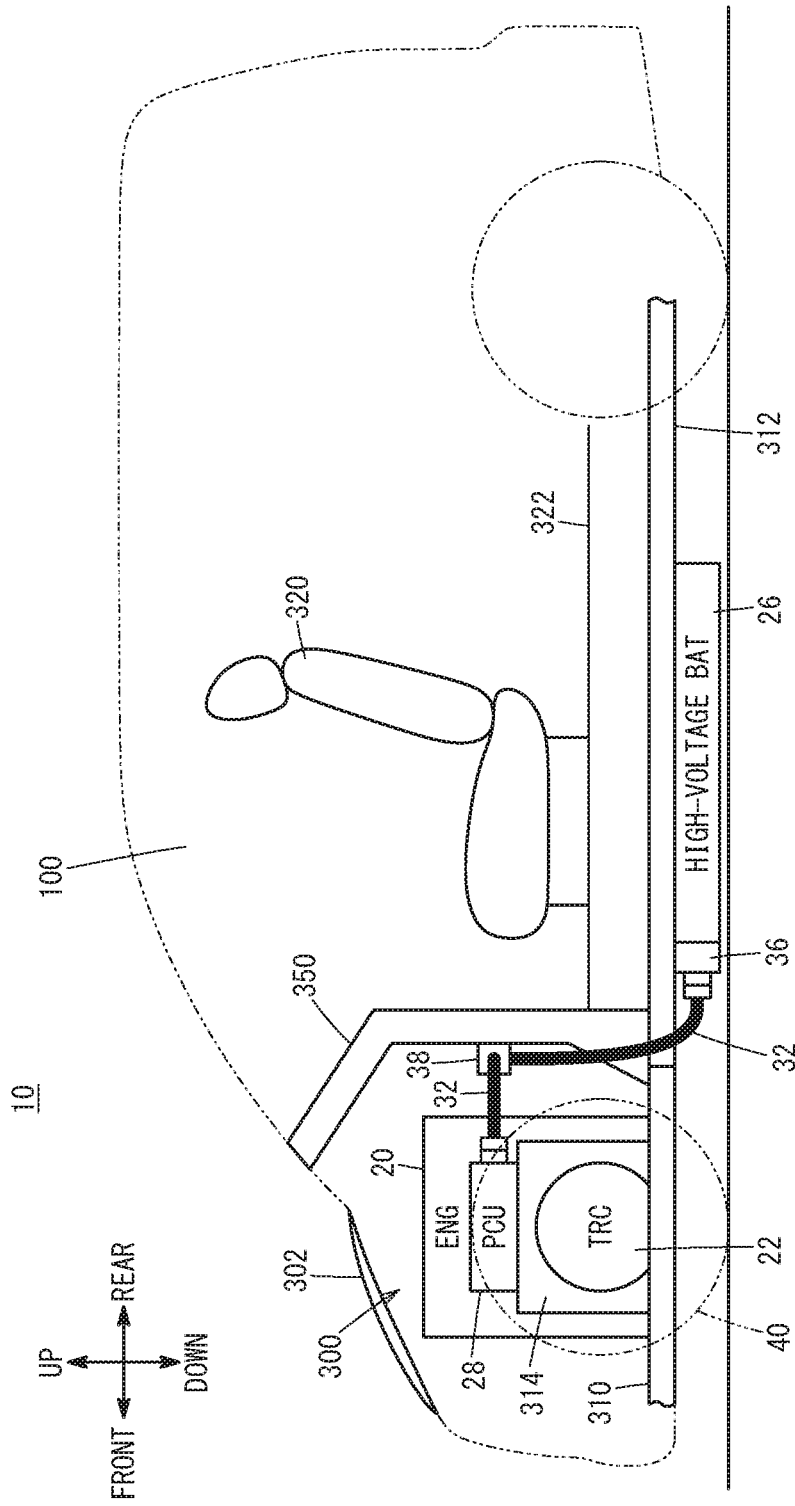
FIG. 1 is a side view that schematically illustrates a structure of a vehicle including a front junction box as a power distribution branch unit according to a first embodiment of the present invention.
Figure 2:
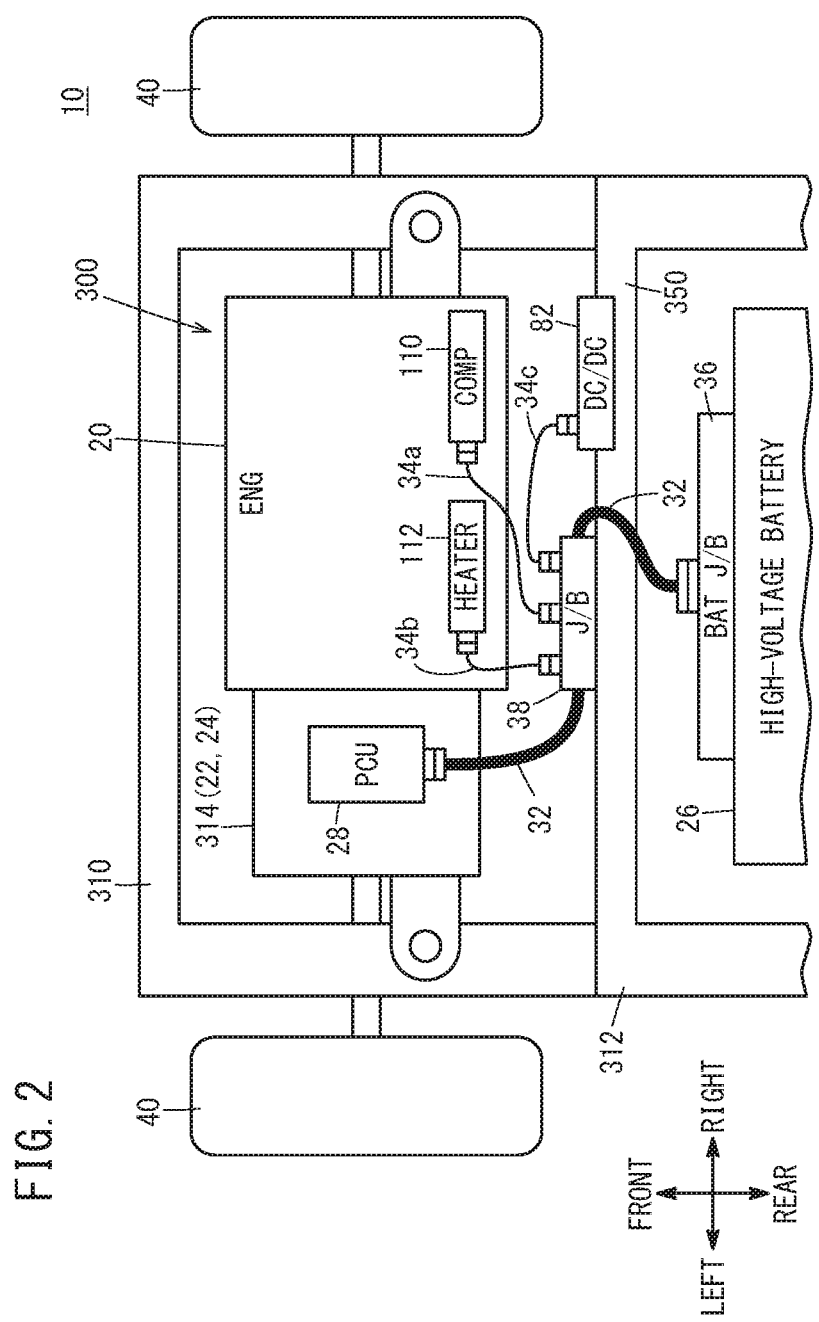
FIG. 2 is a plan view that schematically illustrates the structure of a front side of the vehicle according to the first embodiment.
Figure 3:
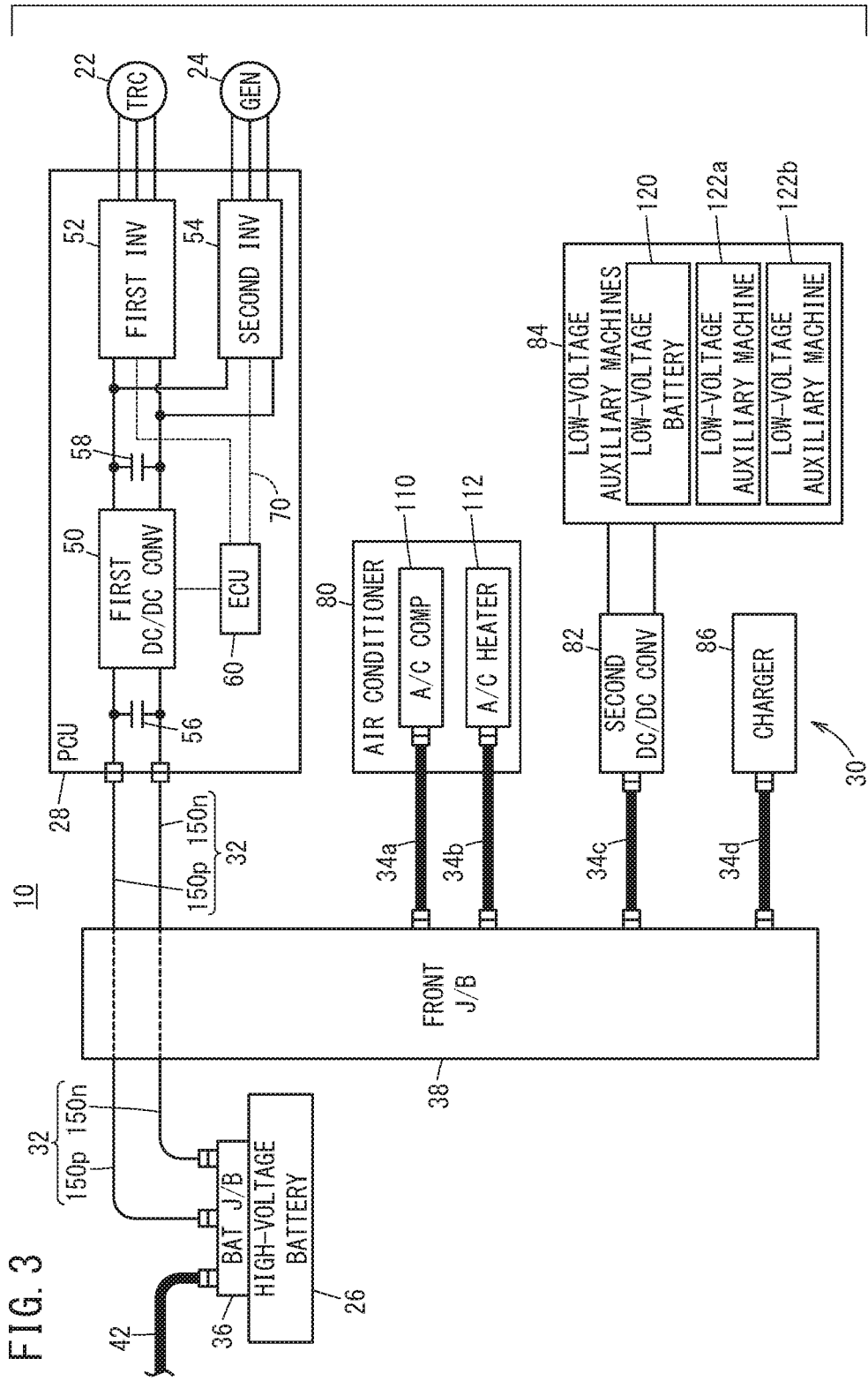
FIG. 3 is an electric circuit diagram that illustrates electric connections in the vehicle according to the first embodiment.

FIG. 1 is a side view that schematically illustrates the structure of a vehicle 10 including a front junction box 38 as a power distribution branch unit according to a first embodiment of the present invention. FIG. 2 is a plan view that schematically illustrates the structure of a front side of the vehicle 10 according to the first embodiment. FIG. 3 is an electric circuit diagram that illustrates electric connections in the vehicle 10 according to the first embodiment.

As illustrated in FIG. 1 to FIG. 3, the vehicle 10 includes, in addition to the front junction box 38, an engine 20, a travel motor 22, a generator 24, a high-voltage battery 26 (hereinafter, also referred to as "battery 26" or "BAT 26"), a power control unit 28 (hereinafter, referred to as "PCU 28"), electric auxiliary machines 30 (FIG. 3), main wiring 32, auxiliary machine wirings 34a to 34d (FIG. 3), and a battery junction box 36.

The vehicle 10 is a hybrid vehicle and uses the engine 20 and the travel motor 22 as a travel driving source. As will be described later, the vehicle 10 may be another type of vehicle. The generator 24 generates power using a driving power of the engine 20. The generator 24 may be used as the travel driving source.

The PCU 28 converts or regulates the power from the BAT 26 and/or the generator 24, and supplies the power to the travel motor 22. In addition, the PCU 28 converts or regulates power Pgen generated by the generator 24 and generated power of the travel motor 22 (regenerative power Preg), and charges the BAT 26.

[A-1-2. Travel Motor 22]

The travel motor 22 is three-phase AC brushless type, and generates motive power Ftrc as the travel driving source of the vehicle 10 and supplies the motive power Ftrc to a front wheel 40 (driving wheel) side. That is to say, the travel motor 22 is driven by one or both of the power Pbat from the high-voltage battery 26 and the power Pgen from the generator 24. In addition, the travel motor 22 performs regeneration when the vehicle 10 brakes, and supplies the regenerative power Preg to the battery 26. The regenerative power Preg may be supplied to the electric auxiliary machines 30.

Hereinafter, the travel motor 22 is also referred to as a TRC motor 22 or a motor 22. The TRC motor 22 may function as a generator, in addition to or instead of the function as a travel motor. Hereinafter, "TRC", "trc", or "t" is added to parameters regarding the travel motor 22. In addition, in FIG. 1 and FIG. 3, the travel motor 22 is expressed as "TRC".

[A-1-3. Generator 24]

The generator 24 is the three-phase AC brushless type, and functions as a generator that generates power by motive power Feng from the engine 20. The power Pgen generated by the generator 24 is supplied to the battery 26, the travel motor 22, or the electric auxiliary machines 30.

Hereinafter, the generator 24 is also referred to as GEN 24. The GEN 24 may function as a travel motor (traction motor), in addition to or instead of the function as a generator (power generation machine). Hereinafter, "GEN", "gen", or "g" is added to parameters regarding the generator 24. In addition, in FIG. 3, the generator 24 is expressed as "GEN". The generator 24 can be used as a starter motor of the engine 20.

[A-1-4. High-Voltage Battery 26]

The high-voltage battery 26 is an energy storage device (energy storage) that includes a plurality of battery cells and can output high voltage (several hundred volts). The high-voltage battery 26 may employ, for example, a lithium ion secondary battery, a nickel hydrogen secondary battery, or the like. The high-voltage battery 26 supplies the power to the travel motor 22 and is charged with the power generated by the generator 24. Instead of or in addition to the battery 26, an energy storage device such as a capacitor can be employed.

[A-1-5. PCU 28]

(A-1-5-1. Outline of PCU 28)

As illustrated in FIG. 3, the PCU 28 is disposed between the battery 26 (or the battery junction box 36), and the travel motor 22 and the generator 24. The PCU 28 converts or regulates the power from the battery 26 and/or the generator 24, and supplies the power to the travel motor 22. In addition, the PCU 28 charges the battery 26 by converting or regulating the power Pgen generated by the generator 24 and the regenerative power Preg of the travel motor 22.

As illustrated in FIG. 3, the PCU 28 includes a first DC/DC converter 50, a first inverter 52, a second inverter 54, a first capacitor 56, a second capacitor 58, and an electronic control unit 60 (hereinafter, referred to as "ECU 60").

(A-1-5-2. First DC/DC Converter 50)

The first DC/DC converter 50 (hereinafter, also referred to as "converter 50") is a step-up/down type converter. The converter 50 boosts the output voltage Vbat of the battery 26 (hereinafter, also referred to as "battery voltage Vbat"), and outputs the boosted voltage to the TRC motor 22. In addition, the converter 50 lowers the output voltage Vgen of the generator 24 (hereinafter, also referred to as "GEN voltage Vgen") or the output voltage Vtrc of the travel motor 22, and supplies the lowered voltage to the battery 26.

(A-1-5-3. First Inverter 52)

The first inverter 52 converts the direct current from the battery 26 into alternating current, and supplies the converted current to the travel motor 22. In addition, the first inverter 52 converts the alternating current from the travel motor 22 into direct current, and supplies the converted current to the battery 26 side.

(A-1-5-4. Second Inverter 54)

The second inverter 54 converts the alternating current from the generator 24 into direct current, and supplies the converted current to the battery 26 side and/or the travel motor 22 side. In addition, when the generator 24 is used as a travel driving source, the second inverter 54 converts the direct current from the battery 26 into alternating current, and supplies the converted current to the generator 24.

(A-1-5-5. First Capacitor 56 and Second Capacitor 58)

The first capacitor 56 and the second capacitor 58 function as smoothing capacitors.

(A-1-5-6. ECU 60)

The ECU 60 is a control circuit (or a control unit) that controls each part of the PCU 28, and includes an input/output unit, an operation unit, and a storage unit that are not shown. The input/output unit exchanges signals with parts of the vehicle 10 through signal lines 70 (communication lines). Note that in FIG. 3, the signal lines 70 are shown in a simplified manner. The input/output unit includes an A/D conversion circuit (not shown) that converts an input analog signal into a digital signal.

The operation unit includes a central processing unit (CPU) and operates by executing programs stored in the storage unit. A part of the functions executed by the operation unit can be achieved by a logic integrated circuit (IC). The programs may be provided from outside through a wireless communication device (for example, a mobile phone or a smart phone) that is not shown. In the operation unit, a part of the programs can be achieved by hardware (circuit components).

The storage unit stores the programs and data to be used by the operation unit, and includes a random access memory (hereinafter, referred to as "RAM"). As the RAM, a volatile memory such as a register and a non-volatile memory such as a flash memory can be used. In addition to the RAM, the storage unit may include a read only memory (hereinafter, referred to as "ROM").

[A-1-6. Electric Auxiliary Machines 30]

(A-1-6-1. Outline of Electric Auxiliary Machines 30)

As illustrated in FIG. 3 etc., the electric auxiliary machines 30 include an air conditioner 80, a second DC/DC converter 82, low-voltage auxiliary machines 84, and a charger 86. The electric auxiliary machines 30 may include other electric auxiliary machines (for example, an external power feeding device).

(A-1-6-2. Air Conditioner 80)

The air conditioner 80 controls, for example, the temperature in a vehicle compartment 100 (FIG. 1), and includes an air compressor 110 and a heater 112. The air compressor 110 circulates fluid that is not shown (such as water). The fluid is used for heating and cooling in the air conditioner 80. The heater 112 heats the fluid.

(A-1-6-3. Second DC/DC Converter 82)

The second DC/DC converter 82 lowers, for example, the battery voltage Vbat, and outputs the lowered voltage to the low-voltage auxiliary machines 84.

(A-1-6-4. Low-Voltage Auxiliary Machines 84)

The low-voltage auxiliary machines 84 include power auxiliary machines that operate at low voltage (for example, 12 V). As illustrated in FIG. 3, the low-voltage auxiliary machines 84 include a low-voltage battery 120 and low-voltage auxiliary machines 122a, 122b (hereinafter, also referred to as "auxiliary machines 122a, 122b" or collectively referred to as "auxiliary machines 122"). In FIG. 3, two auxiliary machines 122 (122a, 122b) are illustrated; however, the number of auxiliary machines 122 may be one, or three or more.

The low-voltage battery 120 (hereinafter, also referred to as "12-V battery 120") supplies power at low voltage (for example, 12 V) to the auxiliary machines 122, and is a lead battery, for example. The auxiliary machines 122 are devices that operate at low voltage. Examples of the auxiliary machines 122 include a navigation device (not shown), a headlight (not shown), and the ECU 60.

[A-1-7. Main Wiring 32]

As illustrated in FIG. 3, the main wiring 32 is a power line that penetrates through a case 160 of the front junction box 38 and connects the PCU 28 and the battery junction box 36 of the high-voltage battery 26. It should be noted that, in FIG. 1 and FIG. 3, the components denoted by a reference sign "32" on both sides of the front junction box 38 are the same main wiring 32.

Figure 4:
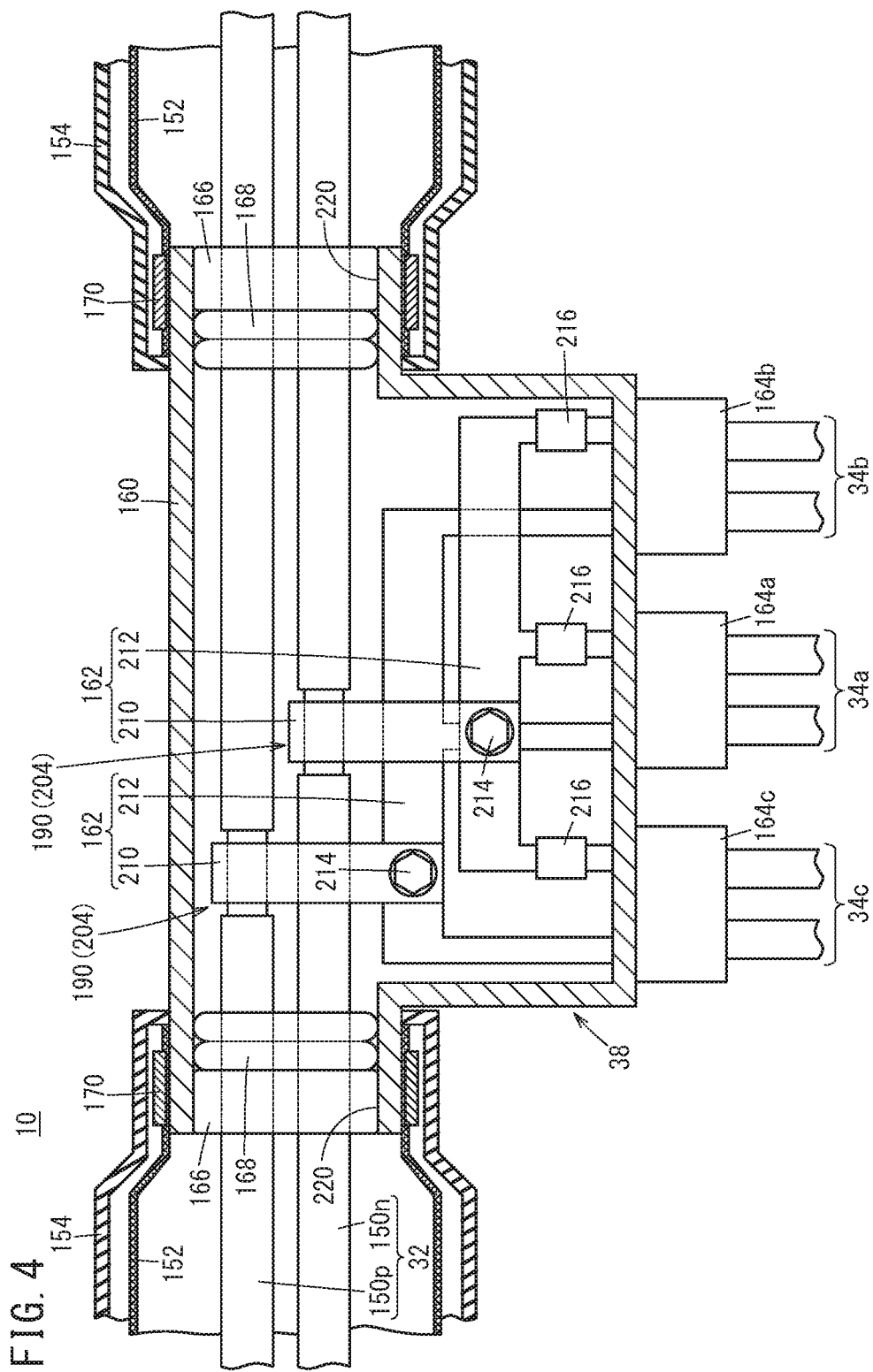
FIG. 4 is a cross-sectional view that schematically illustrates a part of the structure of a main wiring and the front junction box according to the first embodiment.

FIG. 4 is a cross-sectional view that schematically illustrates a part of the structure of the main wiring 32 and the front junction box 38 according to the first embodiment. As illustrated in FIG. 4, the main wiring 32 according to the first embodiment includes two covered cables 150p, 150n (hereinafter, also referred to as "main covered cables 150p, 150n" or collectively referred to as "main covered cables 150"). Between the battery junction box 36 and the front junction box 38, and between the front junction box 38 and the PCU 28, a braided wire 152 is disposed around the covered cables 150p, 150n. In addition, a rubber boot 154 is disposed around the braided wire 152.

As will be described later, the main wiring 32 (covered cables 150p, 150n) forms a part of the front junction box 38. Therefore, details of the covered cables 150p, 150n will be described later in association with the front junction box 38.

[A-1-8. Auxiliary Machine Wirings 34a to 34d]

The auxiliary machine wirings 34a to 34c connect branch couplers 164a to 164c (FIG. 4) of the front junction box 38 and the electric auxiliary machines (the air compressor 110, heater 112, and the like). Three auxiliary machine wirings 34a to 34c are illustrated in FIG. 2 and FIG. 4 but the auxiliary machine wiring 34d is not shown. Hereinafter, the auxiliary machine wirings 34a to 34d are collectively referred to as auxiliary machine wiring 34 and the branch couplers 164a to 164c are collectively referred to as branch couplers 164. The number of auxiliary machine wirings 34 and branch couplers 164 may be one, or two or more.

[A-1-9. Battery Junction Box 36]

The battery junction box 36 (hereinafter, also referred to as "BAT J/B 36") branches the current from the high-voltage battery 26 and supplies the branched current to the front junction box 38, a power apparatus in a rear seat side (not shown), and the like. The BAT J/B 36 is provided to the high-voltage battery 26. In FIG. 3, the battery junction box 36 is connected to the power apparatus in the rear seat side through rear seat side wiring 42 (FIG. 3).

[A-1-10. Front Junction Box 38]

(A-1-10-1. Outline of Front Junction Box 38)

The front junction box 38 (hereinafter, also referred to as "front J/B 38") branches the current from the high-voltage battery 26 and supplies the branched current to the PCU 28 and the electric auxiliary machines 30.

As illustrated in FIG. 4 etc., the front J/B 38 is disposed between the battery 26 (or BAT J/B 36) and the PCU 28. The front J/B 38 branches the current from the battery 26 and supplies the branched current to the PCU 28 and the electric auxiliary machines 30 (such as the air compressor 110 and heater 112).

As illustrated in FIG. 4 etc., the front junction box 38 includes the case 160, the main covered cables 150p, 150n, branch wirings 162, the branch couplers 164a to 164c, retainers 166, grommets 168, and external caulking rings 170.

(A-1-10-2. Case 160)

As illustrated in FIG. 4, the case 160 houses a part of the main covered cables 150p, 150n, the branch wirings 162, the retainers 166, and the grommets 168. The case 160 is provided with a case-side tapered surface 180 (not shown in FIG. 4) to make it easier to hold the retainer 166. Details of the case-side tapered surface 180 will be described later with reference to FIG. 6 and FIG. 8.

(A-1-10-3. Main Covered Cables 150p, 150n)

Figure 5:
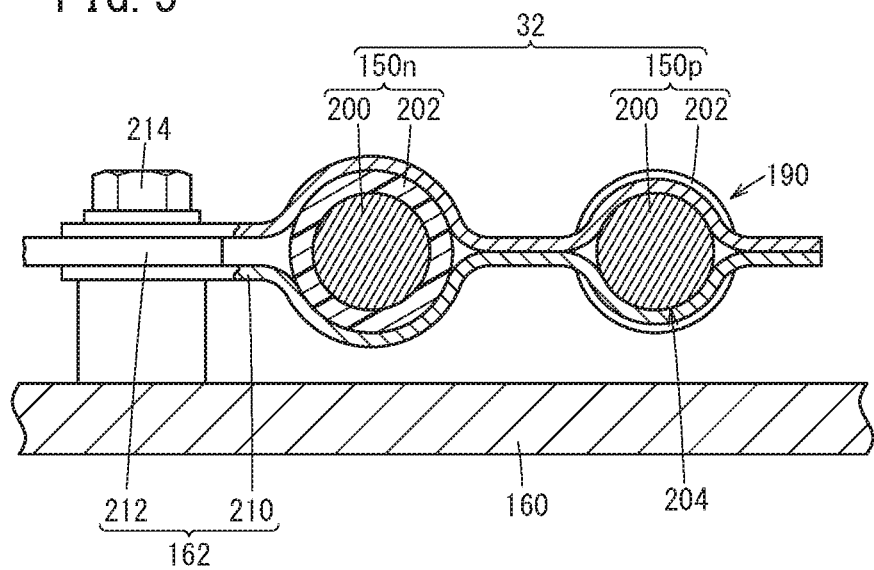
FIG. 5 schematically illustrates a connection part between a main covered cable and a branch wiring according to the first embodiment.

FIG. 5 schematically illustrates a connection part 190 between the main covered cable 150p and the branch wiring 162 according to the first embodiment. As described above, the main covered cables 150p, 150n penetrate through the case 160.

As illustrated in FIG. 5, each of the covered cables 150p, 150n includes a core wire 200 and an insulation cover 202. At the connection part 190, an exposed part 204 where the core wire 200 is exposed, without the insulation cover 202, is formed inside the case 160. The exposed part 204 is formed by removing the insulation cover 202 using a cutter, for example. Alternatively, the formation of the insulation cover 202 on the exposed part 204 may be omitted during the process of covering the core wire 200 with the insulation cover 202.

FIG. 5 shows the connection part 190 between the covered cable 150p and the branch wiring 162. The connection part 190 between the covered cable 150n and the branch wiring 162 is formed in like manner (see FIG. 4).

(A-1-10-4. Branch Wiring 162)

One end of the branch wiring 162 is directly connected to the exposed part 204 of the main covered cable 150p, 150n. The branch wiring 162 branches into a plurality of other ends. The plurality of other ends is connected to the branch couplers 164a to 164c (see FIG. 4). Here, "directly connected" indicates that the branch wiring 162 is in contact with the core wire 200 of the main covered cable 150p, 150n. As illustrated in FIG. 4 and FIG. 5, the branch wirings 162 include fixing members 210 and bridge members 212 that are common.

The fixing member 210 is formed of a conductive material (for example, metal). The fixing member 210 holds and fixes the main covered cables 150p, 150n using a bolt 214, and electrically connects to the core wire 200 of the main covered cable 150p, 150n.

The bridge member 212 connects the fixing member 210 and the branch couplers 164a to 164c, and is formed as a bus bar in the first embodiment. The bridge member 212 is connected to the fixing member 210 by the bolt 214. The bridge member 212 branches to the branch couplers 164a to 164c at the connection with the fixing member 210. A fuse 216 is provided to each branch of the bridge member 212.

(A-1-10-5. Branch Couplers 164a to 164c)

The branch couplers 164a to 164c are fixed to the case 160 and exposed to the outside, and connect the branch wiring 162 and the auxiliary machine wirings 34a to 34c. As described above, the number of branch couplers 164 can be varied in accordance with the number of auxiliary machine wirings 34.

(A-1-10-6. Retainers 166)

Figure 6:
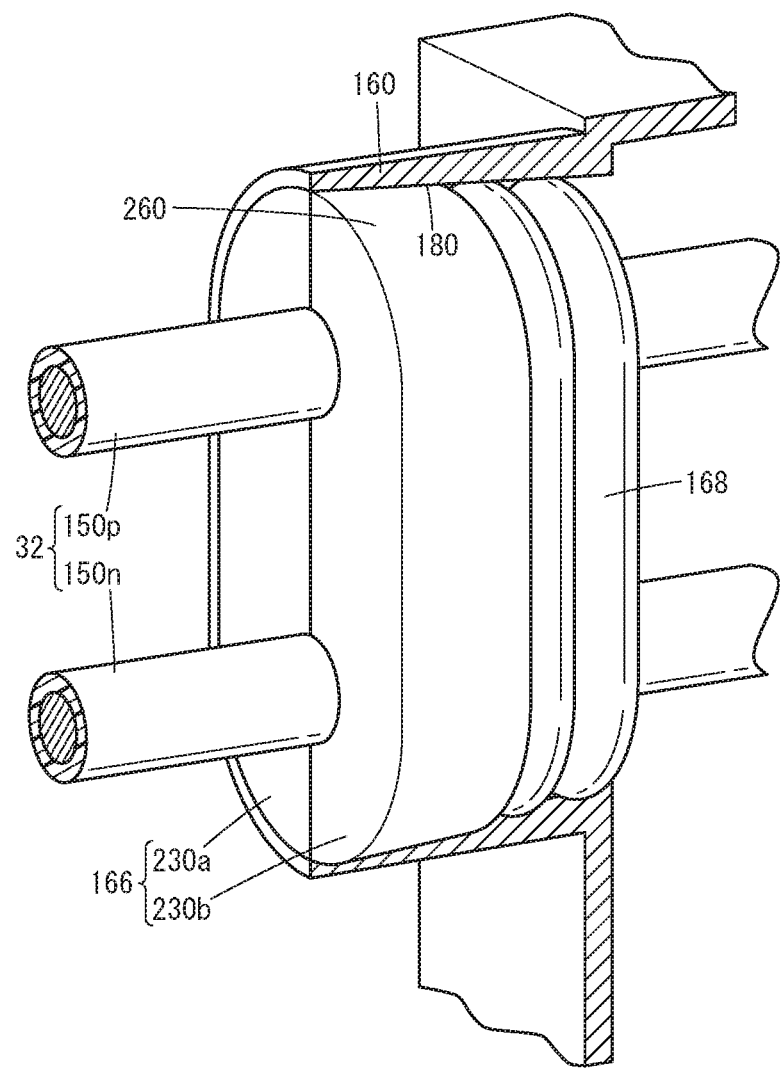
FIG. 6 is a perspective view that schematically illustrates a retainer according to the first embodiment and the vicinity thereof.
Figure 7:
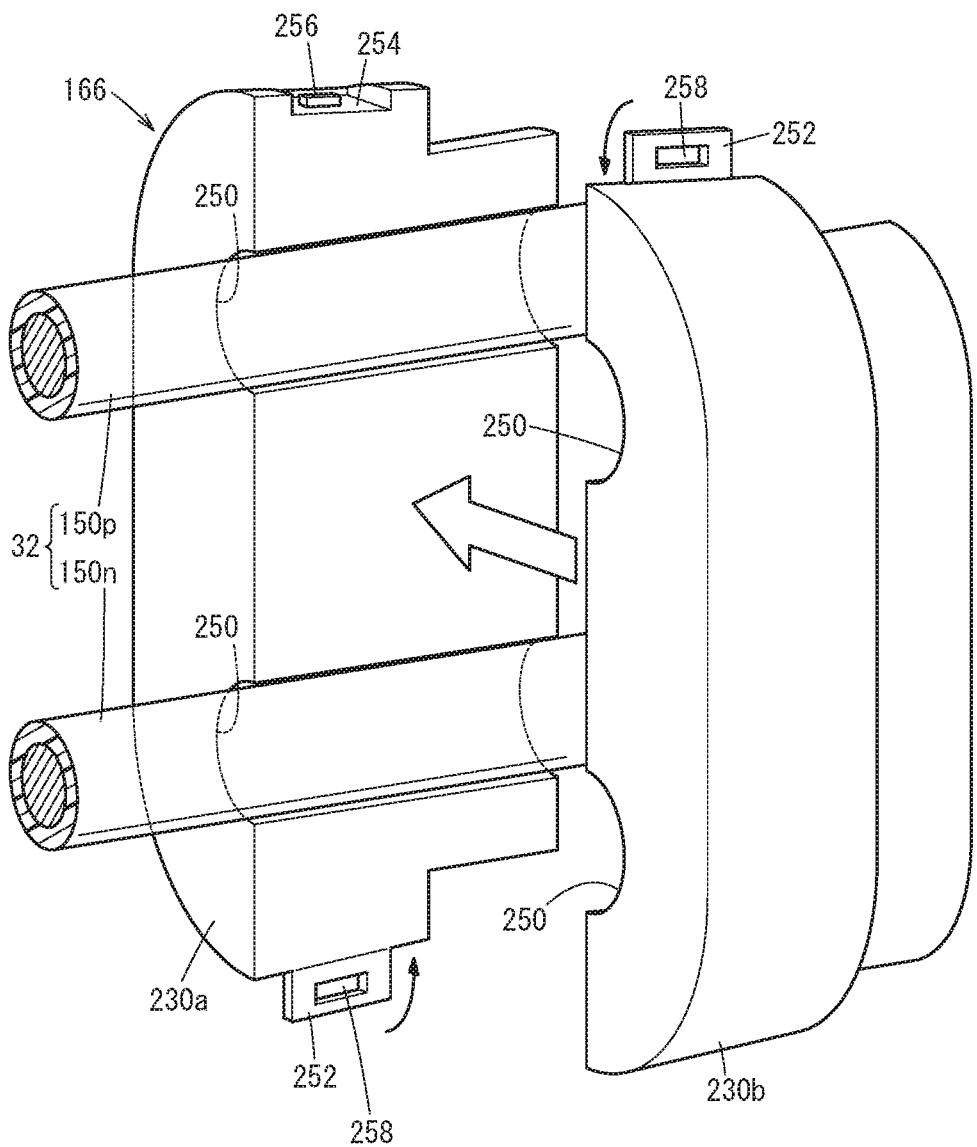
FIG. 7 is an exploded perspective view that schematically illustrates the retainer according to the first embodiment and the vicinity thereof.
Figure 8:
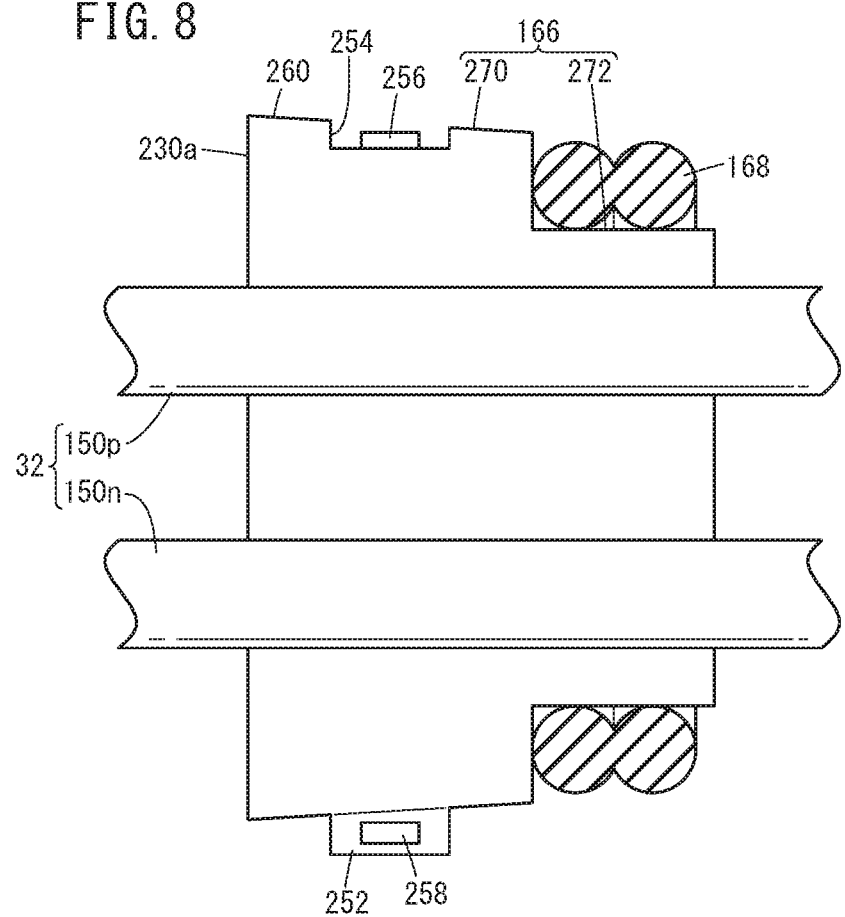
FIG. 8 is a cross-sectional view that schematically illustrates a part of the retainer according to the first embodiment and the vicinity thereof.

FIG. 6 is a perspective view that schematically illustrates the retainer 166 according to the first embodiment and the vicinity thereof. FIG. 7 is an exploded perspective view that schematically illustrates the retainer 166 according to the first embodiment and the vicinity thereof. FIG. 8 is a cross-sectional view that schematically illustrates a part of the retainer 166 according to the first embodiment and the vicinity thereof.

The retainer 166 is a resin member that is disposed inside a hole part 220 (FIG. 4) formed in the case 160, and that fixes the main covered cables 150p, 150n. In the first embodiment, the retainer 166 mainly fixes the main covered cables 150*p*, 150*n*. On the other hand, the grommet 168 mainly has a waterproof function to prevent water from entering the front junction box 38. Thus, the retainer 166 has lower elasticity and higher rigidity than the grommet 168.

As illustrated in FIG. 4, in the first embodiment, one retainer 166 is disposed on each side of the exposed parts 204 (or the connection parts 190) of the main covered cables 150*p*, 150*n*. As illustrated in FIG. 6 etc., each retainer 166 fixes the multiple main covered cables 150*p*, 150*n* together.

As illustrated in FIG. 6 and FIG. 7, the retainer 166 includes a first half body 230*a* and a second half body 230*b*. As illustrated in FIG. 7, the first half body 230*a* includes grooves 250, a claw part 252, a depressed part 254, and a raised part 256. The grooves 250 are portions where the main covered cables 150*p*, 150*n* are disposed, and they have an approximately semicircular shape when viewed from an axial direction of the main covered cables 150*p*, 150*n*. The depressed part 254 houses the entire claw part 252. The raised part 256 is formed in the depressed part 254, and engages with a fitting hole 258 of the claw part 252. In the first embodiment, there are two sets of claw parts 252, depressed parts 254, and raised parts 256. Therefore, the first half body 230*a* and the second half body 230*b* can be fixed together.

As illustrated in FIG. 6 and FIG. 8, a tapered surface 260 is formed on an outer peripheral surface of the retainer 166 (hereinafter, referred to as "retainer-side tapered surface 260"). The retainer-side tapered surface 260 inclines so as to separate from the main covered cables 150*p*, 150*n* toward the outside of the front junction box 38.

As illustrated in FIG. 6, the case 160 is provided with a tapered surface 180 that suits the retainer-side tapered surface 260 (a case-side tapered surface 180). The case-side tapered surface 180 is formed on an inner peripheral surface of the case 160, and inclines so as to separate from the main covered cables 150*p*, 150*n* toward the outside of the front junction box 38.

Thus, when an operator pushes the retainer 166 into the front junction box 38, the retainer-side tapered surface 260 and the case-side tapered surface 180 are held in a pressed state.

As illustrated in FIG. 8, the retainer 166 includes a case contact part 270 and a grommet contact part 272. The case contact part 270 is directly supported by or is in contact with the case 160. The grommet contact part 272 is supported by the case 160 through the grommet 168 (in contact with the grommet 168). In such a structure, the case contact part 270 mainly fixes the main covered cables 150*p*, 150*n* firmly, and the waterproof function is enhanced by the combination of the grommet contact part 272 and the grommet 168.

(A-1-10-7. Grommets 168)

The grommet 168 is a member that prevents water from entering the front junction box 38, and is made of rubber, for example.

(A-1-10-8. External Caulking Rings 170)

As illustrated in FIG. 4, the external caulking ring 170 caulks (or fixes) the case 160, the retainer 166, and the grommet 168 together outside the case 160.

<A-2. Arrangement of Each Part>

As illustrated in FIG. 1 and FIG. 2, the engine 20, the motor 22, the generator 24, and the PCU 28 are disposed inside a front-side room 300. The front-side room 300 functions as an engine room for the engine 20, a motor room for the motor 22, and a generator room for the generator 24.

As illustrated in FIG. 1, the front-side room 300 is surrounded by the vehicle compartment 100, a hood 302, and a sub frame 310 (a frame for the motor). The sub frame 310 is connected to a main frame 312.

The engine 20, the TRC motor 22, and the GEN 24 are supported by the sub frame 310. Between the engine 20 and the sub frame 310, an active control mount (ACM) that reduces vibration transmitted from the engine 20 to the sub frame 310 may be disposed. The PCU 28 is fixed on a motor housing 314 of the travel motor 22. Thus, the PCU 28 is supported by the sub frame 310 through the motor housing 314. In addition, the air compressor 110 and the heater 112 of the air conditioner 80 are supported by the sub frame 310.

As illustrated in FIG. 1, the PCU 28 is fixed to the motor housing 314 that houses the motor 22. The motor housing 314 according to the present embodiment houses the generator 24 in addition to the motor 22.

As illustrated in FIG. 1, the high-voltage battery 26 is disposed below a seat 320 in the vehicle compartment 100 or a floor 322, and supported by the main frame 312.

As illustrated in FIG. 1 etc., the front junction box 38 is disposed on or fixed to a dashboard 350. The dashboard 350 is a part that is disposed between the front-side room 300 and the vehicle compartment 100 and in front of the driver's seat and front passenger's seat. The dashboard 350 includes a dash panel.

<A-3. Effect of First Embodiment>

In the first embodiment, the main covered cables 150*p*, 150*n* penetrate through the case 160 (FIG. 4). On the other hand, the branch couplers 164*a* to 164*c* are disposed through the branch wiring 162 that is connected to the exposed parts 204 of the main covered cables 150*p*, 150*n* (FIG. 4). Thus, by branching the power line without a connector (coupler), layout flexibility can be improved and the front junction box 38 (power distribution branch unit) can be downsized.

The branch wiring 162 and the core wire 200 that is exposed without the insulation cover 202 are connected (FIG. 4 and FIG. 5). Thus, the position of the exposed part 204 of the core wire 200 can be selected; therefore, layout flexibility is improved.

Furthermore, the main covered cables 150*p*, 150*n* are fixed to the case 160 through the retainers 166 (FIG. 4 and FIG. 6). Thus, if vibration is transmitted from the outside to the inside of the case 160 through the main covered cables 150*p*, 150*n*, the retainers 166 can absorb the vibration. In particular, if the vibration absorption characteristic of the retainers 166 is higher than that of the case 160 itself, the vibration can be easily absorbed. Thus, the vibration from the outside is less likely to reach the connection part 190 where the branch wiring 162 and the exposed part 204 of the core wire 200 are connected. Therefore, it becomes easy to prevent the separation between the core wire 200 and the branch wiring 162 due to vibration reaching the connection part 190 from outside.

In the first embodiment, the multiple main covered cables 150*p*, 150*n* are provided (FIG. 4). One retainer 166 is disposed on each side of the exposed parts 204 (FIG. 4). Each retainer 166 fixes the multiple main covered cables 150*p*, 150*n* (FIG. 4).

Thus, compared with a case where the retainer 166 is provided on only one side of the exposed part 204, it is easier to prevent vibration from reaching the connection part 190. Therefore, it becomes further easier to prevent the separation between the core wire 200 and the branch wiring 162 due to vibration reaching the connection part 190 from outside.

In addition, since the multiple main covered cables 150*p*, 150*n* can be fixed together by each retainer 166, the number of parts can be reduced compared with a case where the multiple main covered cables 150*p*, 150*n* are fixed by separate retainers 166.

In the first embodiment, on the outer peripheral surface of the retainer 166, the retainer-side tapered surface 260 that is separated from the main covered cables 150*p*, 150*n* toward the outside of the front junction box 38 (power distribution branch unit) is formed (FIG. 6 and FIG. 8). On the inner peripheral surface of the case 160, the case-side tapered surface 180 that is disposed in the pressed state on the retainer-side tapered surface 260 is formed (FIG. 6). Therefore, by pushing the retainer 166 into the case 160, the retainer 166 can be positioned.

In the first embodiment, the retainer 166 includes the first half body 230*a* and the second half body 230*b* (FIG. 6 and FIG. 7). The first half body 230*a* includes the claw part 252 (FIG. 7). The second half body 230*b* includes the depressed part 254 that houses the entire claw part 252 and the raised part 256 that is formed in the depressed part 254 and engages with the claw part 252 (FIG. 7). Thus, the main covered cables 150*p*, 150*n* can be easily fixed by the retainer 166. In addition, since the entire claw part 252 is disposed inside the depressed part 254, the claw part 252 does not interfere when the retainer 166 is pushed into the case 160 and fixed.

In the first embodiment, the retainer 166 includes the case contact part 270 that is directly supported by the case 160, and the grommet contact part 272 that is supported by the case 160 through the grommet 168 (FIG. 8). As described above, the displacement of the retainer 166 can be easily prevented in the part where the case contact part 270 is directly supported by the case 160, and the waterproof performance can be secured by the grommet contact part 272.

The vehicle 10 according to the first embodiment includes the front junction box 38 (power distribution branch unit), the engine 20, the travel motor 22, the battery 26 (energy storage device), the PCU 28 (power conversion device), and the electric auxiliary machines such as the air conditioner 80 (FIG. 1 to FIG. 3). The main covered cables 150*p*, 150*n* of the front junction box 38 connect the battery 26 and the PCU 28 (FIG. 1 to FIG. 3). The auxiliary machine wirings 34*a* to 34*c* connect between the branch couplers 164*a* to 164*c* and the electric auxiliary machines (FIG. 2 and FIG. 3). The PCU 28 converts the power from the battery 26 and supplies the converted power to the travel motor 22.

Thus, even when the current from the battery 26 is branched using the front junction box 38, it is not necessary to provide a connector for the main covered cables 150*p*, 150*n* in the front junction box 38.

In addition, in the vehicle 10 in which the engine 20 generates vibration, even when the vibration is transmitted to the connection parts 190 between the main covered cables 150*p*, 150*n* and the branch wirings 162, the connection in the connection parts 190 is maintained easily in a favorable manner by suppressing tension and/or twist of the main covered cables 150*p*, 150*n*.

In the first embodiment, the front junction box 38 (power distribution branch unit) is disposed on the dashboard 350 of the vehicle 10 (FIG. 1 and FIG. 2). Thus, the front junction box 38 is fixed to a part of the vehicle body that is different from the sub frame 310 (that supports the travel motor 22 and the PCU 28 (power conversion device)) and the main frame 312 (that supports the battery 26 (energy storage device)) (FIG. 1 and FIG. 2). Therefore, the vibration from the travel motor 22 is less likely to transmit to the front junction box 38. In the vehicle 10 that always generates vibration, the electric connections in the front junction box 38 can be maintained easily in a favorable manner.

In addition, even when the front junction box 38 is supported by or fixed to a part of the vehicle body that is different from the sub frame 310 and the main frame 312, the front junction box 38 can be disposed in a position relatively close to the PCU 28 when the front junction box 38 is fixed to the dashboard 350. Furthermore, the front junction box 38 can be also disposed in a position relatively close to the air conditioner 80, in addition to the PCU 28; therefore, space saving can be easily achieved.

B. Second Embodiment

<B-1. Structure>

Figure 9:
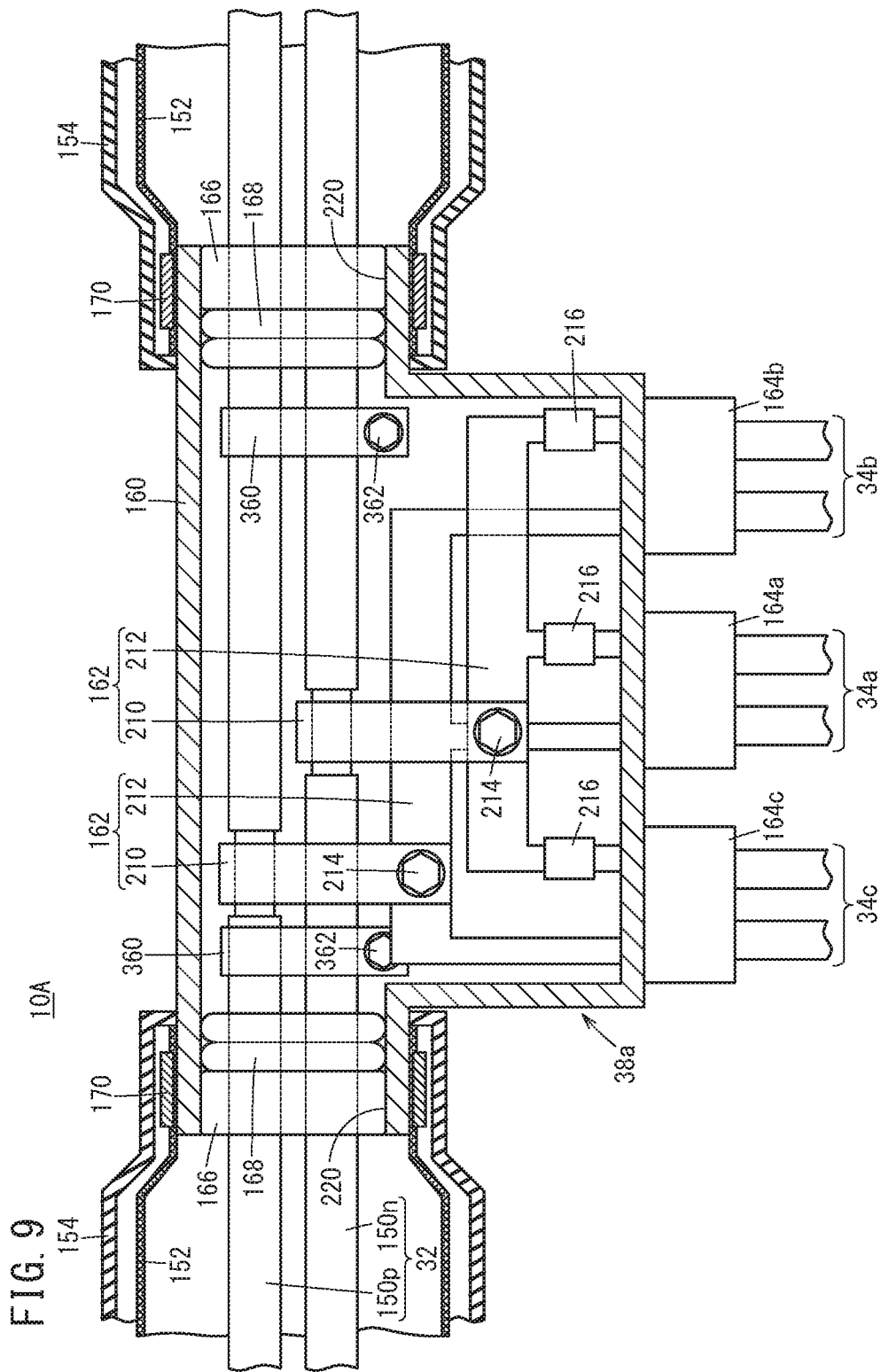
FIG. 9 is a cross-sectional view that schematically illustrates a part of the structure of the main wiring and a front junction box according to a second embodiment.

FIG. 9 is a cross-sectional view that schematically illustrates a part of the structure of the main wiring 32 and a front junction box 38*a* according to a second embodiment. The structure of a vehicle 10A according to the second embodiment is basically the same as the structure of the vehicle 10 according to the first embodiment. Hereinafter, the same reference signs denote the common components in the first embodiment and the second embodiment, and detailed description thereof is not repeated.

In the first embodiment, the main covered cables 150*p*, 150*n* are fixed by the branch wiring 162, the retainers 166, and the grommets 168 (FIG. 4, FIG. 5). On the other hand, in the front junction box 38*a* according to the second embodiment, the main covered cables 150*p*, 150*n* are fixed by internal fixing members 360, in addition to the branch wirings 162, the retainers 166, and the grommets 168.

Figure 10:
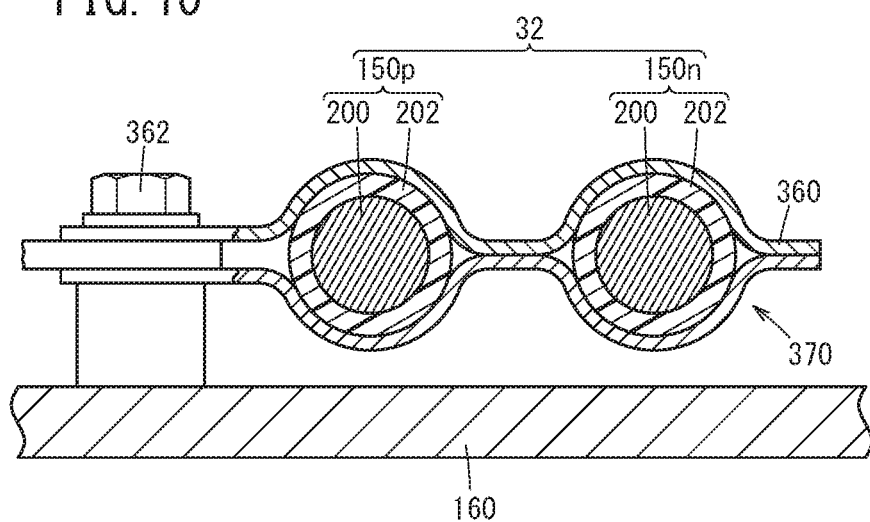
FIG. 10 schematically illustrates a connection part between the main covered cables and an internal fixing member according to the second embodiment.

FIG. 10 schematically illustrates a connection part 370 between the main covered cables 150*p*, 150*n* and the internal fixing member 360 according to the second embodiment. At the connection part 190 between the main covered cables 150*p*, 150*n* and the branch wiring 162, the core wire 200 is exposed (FIG. 4 and FIG. 5). On the other hand, at the connection part 370 where the main covered cables 150*p*, 150*n* and the internal fixing member 360 are connected, the core wires 200 are covered with the insulation covers 202 (FIG. 9 and FIG. 10). That is to say, the internal fixing member 360 holds the core wires 200 and the insulation covers 202 together, and is fixed to the case 160 using a bolt 362.

<B-2. Effect of Second Embodiment>

In the second embodiment as above, the following effects are obtained, in addition to or instead of the effects in the first embodiment.

That is to say, in the second embodiment, the front junction box 38*a* (power distribution branch unit) includes the internal fixing members 360 that fix the main covered cables 150*p*, 150*n* to the case 160 without being in contact with the core wires 200 inside the case 160 (FIG. 9 and FIG. 10). Thus, since the main covered cables 150*p*, 150*n* are fixed by the internal fixing members 360 in addition to the retainers 166 and the like, the connection in the connection part 190 between the main covered cables 150*p*, 150*n* and the branch wiring 162 is maintained easily in a more favorable manner.

C. Modifications

Note that the present invention is not limited to the above embodiments, and can employ various structures on the basis of the description in this specification. For example, the following structure can be employed.

<C-1. Application Targets>

The vehicle 10 according to the first embodiment includes the engine 20, the travel motor 22, and the generator 24 (FIG. 1). However, the present invention is not limited to the structure from the viewpoint of protecting the connection part 190 between the main wiring 32 (main covered cables 150p, 150n) and the branch wiring 162, for example. For example, the vehicle 10 may be an electric vehicle that does not include the engine 20 (for example, an electric automobile or a fuel cell vehicle). Alternatively, the vehicle 10 may include a plurality of travel motors 22 and generators 24. This structure is similarly applicable to the vehicle 10A according to the second embodiment.

<C-2. Rotary Electric Machine>

The travel motor 22 and the generator 24 in the first embodiment are the three-phase AC brushless type (FIG. 3). However, the present invention is not limited to the example from the viewpoint of protecting the connection part 190 between the main wiring 32 and the branch wiring 162, for example. The travel motor 22 and the generator 24 may be DC type or brush type. This example is similarly applicable to the second embodiment.

<C-3. Power Source>

In the first embodiment, it is assumed that the main power source that supplies power to the inside of the vehicle 10 is the high-voltage battery 26 (FIG. 1 to FIG. 3). However, the present invention is not limited to the structure from the viewpoint of protecting the connection part 190 between the main wiring 32 and the branch wiring 162, for example. The main power source may be the generator 24, for example (that is to say, the generator 24 can be used as a range extender). In this case, the main covered cables 150p, 150n can be disposed between the generator 24 and the PCU 28 and the main covered cables 150p, 150n can be branched into the branch wirings 162 inside a junction box that is similar to the front junction box 38. This structure is similarly applicable to the second embodiment.

<C-4. PCU 28>

In the first embodiment, the PCU 28 includes the first DC/DC converter 50, the first inverter 52, the second inverter 54, the first capacitor 56, the second capacitor 58, and the ECU 60 (see FIG. 3). However, the present invention is not limited to the structure from the viewpoint of converting (or regulating) the power from the high-voltage battery 26 and supplying the power to the travel motor 22.

For example, the first DC/DC converter 50 may be omitted from the PCU 28. Alternatively, the second inverter 54 may be omitted from the PCU 28 (in this case, the generator 24 is also omitted). Alternatively, the first inverter 52 (and the first DC/DC converter 50) may be omitted if the travel motor 22 is DC type. Note that PCU 28 can include an on/off switch as a process to convert (or regulate) the power from the high-voltage battery 26 if the first DC/DC converter 50 and the first inverter 52 are omitted. This structure is similarly applicable to the second embodiment.

<C-5. Front Junction Box 38>

[C-5-1. Structure]

(C-5-1-1. Main Covered Cables 150p, 150n)

In the first embodiment, the number of the main covered cables 150 is two in the front junction box 38 (FIG. 4, for example). However, the present invention is not limited to the example from the viewpoint of branching the current in the front junction box 38, for example. The number of main covered cables 150 may be one, or three or more in the front junction box 38. This example is similarly applicable to the second embodiment.

(C-5-1-2. Branch Wiring 162)

The branch wiring 162 in the first embodiment is formed as a bus bar (FIG. 4, for example). However, in regard to the wiring branched from the main covered cables 150p, 150n, the branch wiring 162 may be formed as a member other than a bus bar (for example, a covered cable). This structure is similarly applicable to the second embodiment.

(C-5-1-3. Retainer 166)

In the first embodiment, two retainers 166 are provided (FIG. 4). However, the present invention is not limited to the example from the viewpoint of fixing one or more main covered cables 150, for example. The number of retainers 166 may be one, or three or more. This example is similarly applicable to the second embodiment.

In the first embodiment, one retainer 166 fixes two main covered cables 150p, 150n (FIG. 4, for example). However, the present invention is not limited to the example from the viewpoint of fixing the main covered cables 150p, 150n, for example. For example, one retainer 166 may be provided for each main covered cable 150. Alternatively, when three or more main covered cables 150 are provided, one retainer 166 can fix the three or more main covered cables 150. This example is similarly applicable to the second embodiment.

In the first embodiment, the retainer 166 and the grommet 168 are provided as separate members (FIG. 4, for example). However, the present invention is not limited to the example from the viewpoint of fixing the main covered cable(s) 150, for example. The retainer 166 may have a function as the grommet 168 (or the grommet 168 may have a function as the retainer 166).

The retainer 166 in the first embodiment fixes the first half body 230a and the second half body 230b to each other by using two sets of claw parts 252, depressed parts 254, and raised parts 256 (FIG. 7, for example). However, the present invention is not limited to the example from the viewpoint of fixing the main covered cable(s) 150, for example. For example, the number of sets of the claw parts 252, depressed parts 254, and raised parts 256 may be one when the first half body 230a and the second half body 230b are connected by a hinge structure.

The retainer 166 in the first embodiment is formed of the first half body 230a and the second half body 230b (FIG. 7, for example). However, the present invention is not limited to the example from the viewpoint of fixing the main covered cable(s) 150, for example. For example, the retainer 166 may be formed of only one member without separating the member into the first half body 230a and the second half body 230b.

[C-5-2. Arrangement]

In the first embodiment, the front junction box 38 is fixed to the dashboard 350 (FIG. 1 and FIG. 2). However, the present invention is not limited to the structure from the viewpoint of fixing the front junction box 38 to a part of the vehicle body that is different from the sub frame 310 and the main frame 312, for example. The front junction box 38 can be fixed to a side frame or a damper housing of the vehicle 10, for example. Note that the side frame is a frame that extends from the main frame 312 toward the front side of the vehicle 10 and is positioned at the side of the front-side room 300. The damper housing is a housing for a damper of the front wheel 40 (FIG. 1 and FIG. 2).

The present invention is not particularly limited to the embodiments described above, and various modifications are possible without departing from the essence and gist of the present invention.

What is claimed is:

1. A power distribution branch unit comprising:
a case;
at least one main covered cable configured to penetrate through the case and including an exposed part where a core wire is exposed without an insulation cover inside the case;
a branch wiring disposed inside the case and having one end connected to the exposed part of the main covered cable;
a branch coupler connected to another end of the branch wiring and fixed to the case so as to be exposed to an outside; and
at least one retainer disposed inside a hole part that is formed in the case and configured to fix the main covered cable, wherein:
the main covered cable comprises a plurality of main covered cables;
the retainer is disposed one on each side of the exposed part; and
each retainer is configured to fix the plurality of main covered cables.

2. The power distribution branch unit according to claim 1, wherein the retainer includes a case contact part directly supported by the case and a grommet contact part supported by the case through a grommet.

3. The power distribution branch unit according to claim 1, wherein the power distribution branch unit includes an internal fixing member configured to fix the main covered cable to the case without being in contact with the core wire inside the case.

4. A power distribution branch unit comprising:
a case;
at least one main covered cable configured to penetrate through the case and including an exposed part where a core wire is exposed without an insulation cover inside the case;
a branch wiring disposed inside the case and having one end connected to the exposed part of the main covered cable;
a branch coupler connected to another end of the branch wiring and fixed to the case so as to be exposed to an outside; and
at least one retainer disposed inside a hole part that is formed in the case and configured to fix the main covered cable, wherein:
on an outer peripheral surface of the retainer, a retainer-side tapered surface that inclines so as to separate from the main covered cable toward an outside of the power distribution branch unit is formed; and
on an inner peripheral surface of the case, a case-side tapered surface disposed in a pressed state on the retainer-side tapered surface is formed.

5. The power distribution branch unit according to claim 4, wherein the retainer includes a case contact part directly supported by the case and grommet contact part supported by the case through a grommet.

6. The power distribution branch unit according to claim 4, wherein the power distribution branch unit includes an internal fixing member configured to fix the main covered cable to the case without being in contact with the core wire inside the case.

7. A power distribution branch unit comprising:
a case;
at least one main covered cable configured to penetrate through the case and including an exposed part where a core wire is exposed without an insulation cover inside the case;
a branch wiring disposed inside the case and having one end connected to the exposed part of the main covered cable;
a branch coupler connected to another end of the branch wiring and fixed to the case so as to be exposed to an outside; and
at least one retainer disposed inside a hole part that is formed in the case and configured to fix the main covered cable, wherein:
the retainer includes a first half body and a second half body;
the first half body includes a claw part; and
the second half body includes a depressed part configured to entirely house the claw part, and a raised part formed inside the depressed part and configured to engage with the claw part.

8. The power distribution branch unit according to claim 7, wherein the retainer includes a case contact part directly supported by the case and a grommet contact part supported by the case through a grommet.

9. The power distribution branch unit according to claim 7, wherein the power distribution branch unit includes an internal fixing member configured to fix the main covered cable to the case without being in contact with the core wire inside the case.

10. A vehicle including a power distribution branch unit, an engine, a travel motor, an energy storage device, a power conversion device, and an electric auxiliary machine,
the power distribution branch unit comprising:
a case;
at least one main covered cable configured to penetrate through the case and including an exposed part where a core wire is exposed without an insulation cover inside the case;
a branch wiring disposed inside the case and having one end connected to the exposed part of the main covered cable;
a branch coupler connected to another end of the branch wiring and fixed to the case so as to be exposed to an outside; and
at least one retainer disposed inside a hole part that is formed in the case and configured to fix the main covered cable, wherein:
the main covered cable of the power distribution branch unit is configured to connect the energy storage device and the power conversion device;
the branch coupler and the electric auxiliary machine are connected by an auxiliary machine wiring; and
the power conversion device is configured to convert power from the energy storage device and supply the converted power to the travel motor.

11. The vehicle according to claim 10, wherein the power distribution branch unit is disposed on a dashboard of the vehicle.

* * * * *